United States Patent [19]
Sametz et al.

[11] Patent Number: 5,518,468
[45] Date of Patent: May 21, 1996

[54] COMPENSATION FOR FLUID VISCOSITY IN AUTOMATIC TRANSMISSION FRICTION ELEMENT ENGAGEMENT

[75] Inventors: Ernest S. Sametz, Allen Park; Timothy J. Kropf, Westland; Eileen A. Schock, Dexter, all of Mich.

[73] Assignee: Ford Motor Company, Dearborn, Mich.

[21] Appl. No.: 267,733

[22] Filed: Jun. 29, 1994

[51] Int. Cl.$^6$ .................................................. F16H 61/26
[52] U.S. Cl. ............................ 477/156; 477/98; 477/158; 477/175
[58] Field of Search .............................. 174/335, 336 R; 477/98, 154, 156 OR, 158, 163, 175, 176

[56] References Cited

U.S. PATENT DOCUMENTS

| | | | |
|---|---|---|---|
| 5,060,770 | 10/1991 | Hirano et al. | 477/98 X |
| 5,072,390 | 12/1991 | Lentz et al. | 477/154 X |
| 5,086,670 | 2/1992 | Nitz et al. | 477/154 |
| 5,150,297 | 9/1992 | Daubenmier et al. | |
| 5,157,608 | 10/1992 | Sankpal et al. | |
| 5,179,875 | 1/1993 | Brown. | |
| 5,188,005 | 2/1993 | Sankpal et al. | |
| 5,211,079 | 5/1993 | Runde et al. | 477/119 X |
| 5,216,606 | 6/1993 | Lentz et al. | 477/154 X |
| 5,261,295 | 11/1993 | Iwanaga et al. | 477/98 |
| 5,272,630 | 12/1993 | Brown et al. | |
| 5,305,663 | 4/1994 | Leonard et al. | |
| 5,383,820 | 1/1995 | Mori | 477/154 X |

Primary Examiner—Charles A. Marmor
Assistant Examiner—Peter Kwon
Attorney, Agent, or Firm—Frank G. McKenzie; Roger L. May

[57] ABSTRACT

A technique for controlling the rate of engagement of a friction element in response to a commanded change in operating range of an automatic transmission. Hydraulic pressure at a blip magnitude fills the hydraulic cylinder of a friction element. The pressure magnitude at the base of a pressure ramp and a magnitude at the top of the ramp are calibrated over a range of transmission oil temperature for each type of range change required by the vehicle operator. The calibrations minimize the length of engagement and produce a smooth engagement. Execution of an algorithm produces a high level of pressure magnitude on the basis of these calibrated values, a step down at the base of a ramp, a rate of increase during the period of engagement, and a maximum pressure at the top of the ramp.

12 Claims, 3 Drawing Sheets

COMPENSATION FOR FLUID VISCOSITY IN AUTOMATIC TRANSMISSION FRICTION ELEMENT ENGAGEMENT

BACKGROUND OF THE INVENTION

1. Field of the Invention

This invention relates to the field of automatic transmissions for automotive vehicles. More particularly, the invention pertains to the field of electronic control of hydraulic pressure supplied to an automatic transmission clutch or brake.

2. Description of the Prior Art

Changes among the operating ranges of an automatic transmission are initiated by moving a gear selector lever among the park, reverse, neutral, and forward range positions. Generally, these range selections are made with the engine running at idle speed. When the forward drive range and reverse range are selected, elements of planetary gearsets are interconnected and/or are held against rotation on the transmission casing by engaging hydraulic friction clutches and brakes.

Engagement of these hydraulically-actuated friction elements is made in two phases. During the first phase, called the blip phase, a large magnitude of pressurized hydraulic fluid is applied to the hydraulic cylinder to force a piston against sets of friction discs and into contact with load blocks that react the hydraulic force applied to the piston. During this phase, clearance among these components of the friction element are taken up, but there is little or no torque transmitted through the friction element.

At the end of the blip phase, hydraulic pressure applied to the friction element decreases rapidly to a magnitude substantially below the magnitude of pressure applied during the blip phase. Then, when pressure at this relatively low magnitude is present within the hydraulic cylinder of the friction element, a ramp phase begins and pressure within the cylinder increases linearly over time to a magnitude that produces the maximum torque capacity of the friction element. Engagement of the friction element that produces a change in operating range of the transmission should be completed quickly, i.e., soon after the vehicle operator changes the position of the shift lever, smoothly, as imperceptibly as possible, and without harshness.

Conventionally, the magnitude of pressure during the blip phase and the rate of increase of pressure during the ramp phase are controlled electronically on the basis of the engine speed at the beginning of friction element engagement. Unfortunately, clutch and brake engagements produced by this strategy are inconsistent with respect to the length of time required to complete each engagement and the extent to which the operator can sense their occurrence.

SUMMARY OF THE INVENTION

To avoid these difficulties, a strategy for controlling the magnitude of hydraulic pressure supplied to the friction element according to the invention compensates for a wide range of viscosity of the transmission fluid caused by differences in its temperature. To account for the large temperature range over which changes in operating ranges are made, hydraulic pressure is controlled as a function of transmission oil temperature. This technique achieves consistent flow rates to the friction element because an increase in oil viscosity caused by low temperature is offset by higher pressure supplied to the friction element.

During the ramp phase of engagement, while engine speed is changing, friction element pressure compensates for reductions of engine speed by changing the rate of increase in pressure during the period of engagement.

A method according to this invention for controlling engagement of a friction element of an automatic transmission having selectable operating ranges, includes watching for a change in the selected range and determining the character of the change in selected range from the movement of a range selector lever controlled manually by the vehicle operator. The current temperature of transmission fluid used to engage the friction element is monitored continually. The control supplies to the friction element during a blip phase of engagement high of fluid pressure corresponding to the current oil temperature and the character of the change in selected range and low pressure at the end of the blip phase as determined with reference to current oil temperature and the character of the change in selected range. Next, desired magnitudes at the beginning and end of the ramp phase of engagement of friction element fluid pressure are determined, and pressure is supplied to the friction element during a first interval of the ramp phase, the pressure increasing over time at a first rate of increase determined from said desired magnitudes at the beginning and end of the ramp phase and a desired length of the ramp phase.

Current engine speed is monitored to establish the end of the first interval and the beginning of a second interval of the ramp phase when engine speed decreases due to engagement of the friction element. Friction element fluid pressure is maintained substantially constant at the magnitude corresponding to the end of the first interval for the duration of the second interval.

Current engine speed is again monitored to establish the end of the second interval and the beginning of a third interval of the ramp phase when engine speed stops decreasing due to engagement of the friction element. Friction element fluid pressure is increased at a second time rate of increase on the basis of engine speed.

DESCRIPTION OF THE PREFERRED EMBODIMENT

Figure 8:
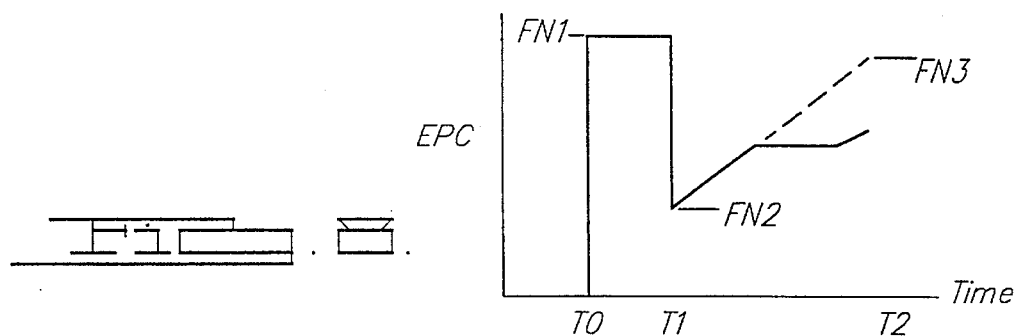
FIG. 8 is a graph showing the variation of EPC over a period of engagement of a friction element.
Figure 9:
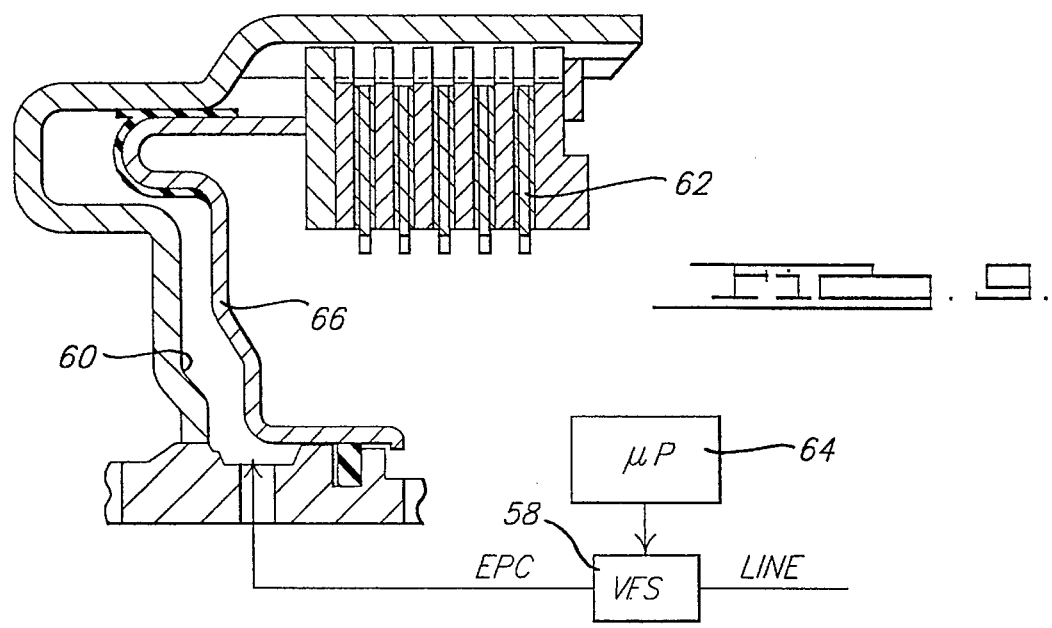
FIG. 9 is a schematic diagram showing an arrangement including the solenoid, valve, friction element, and computer.

The magnitude of fluid pressure in a friction element of an automatic transmission produced by an electronic control system operating according to this invention is shown in FIG. 8. A first portion of the graph, extending from the beginning of friction element engagement, time T0, to the end of the blip phase, at time T1, includes maximum EPC pressure magnitude FN1. Pressure is reduced sharply at T1 to magnitude FN2 located at the base of a pressure ramp, which defines, with a maximum magnitude FN3 present at time T2, the time rate of increase of pressure during the ramp phase. Compensation for engine speed may interrupt the ramp function at a lower pressure than FN3, as will be discussed below.

The variable X, is an index used to probe electronic memory to determine the corresponding magnitude of the variables FN1, FN2, FN3, and FN4. The magnitude of variable X is determined by the character of the change of selected operating range commanded by the vehicle operator. For example, X may have the value 1 to indicate a ratio change from forward range to reverse range, 2 for a range change from reverse to forward, 3 for a range change from neutral to reverse, and 4 for a range change from neutral to forward. Four functions of FN1, FN2, FN3, and FN4 are stored in electronic memory, one function corresponding to each value of the variable X.

The variable TOT represents transmission oil temperature; engine speed is NE.

Figure 1:
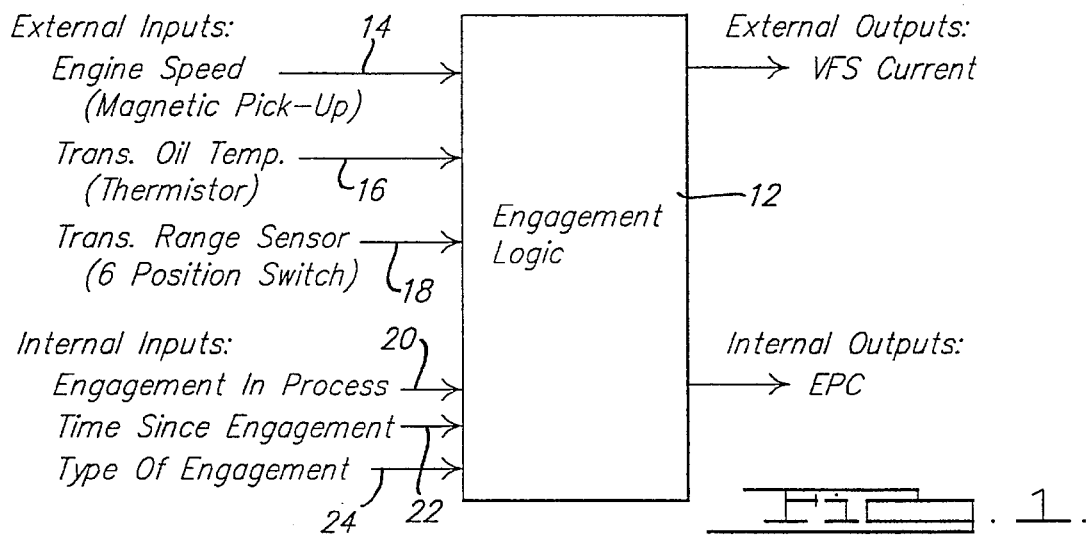
FIG. 1 is a diagram showing items of information required to execute an algorithm that controls engagement of a friction element during a change in operating range of an automatic transmission.
Figure 2:
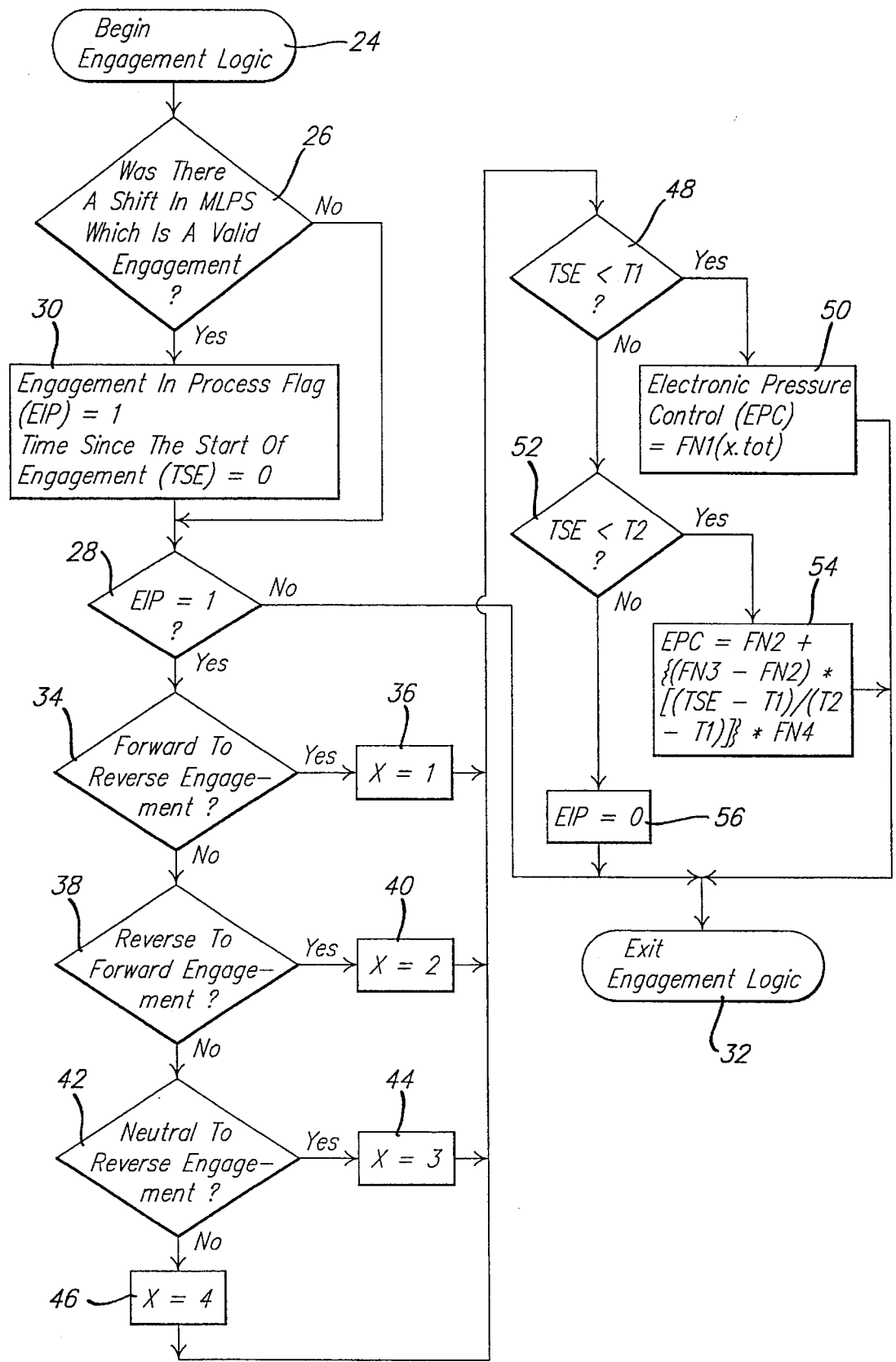
FIG. 2 is a diagram illustrating the logic of a control algorithm according to this invention.
Figure 7:
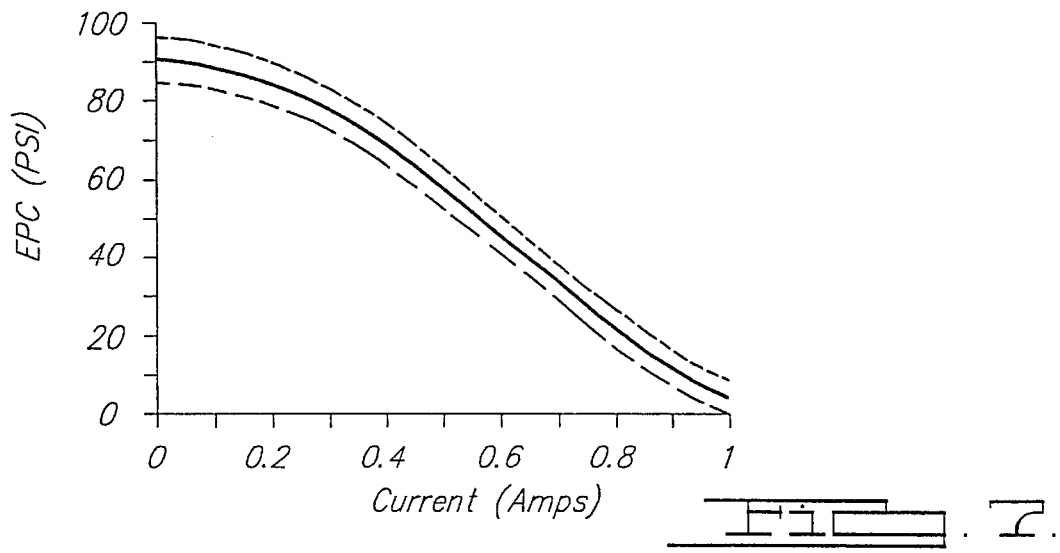
FIG. 7 is a graph showing the relationship between electrical current applied to a variable force solenoid and the corresponding magnitude of EPC. An acceptable range of values about the nominal is illustrated.

FIG. 1 shows information required for a computer to execute the control algorithm whose logic is illustrated in FIG. 2. Information in the form of a signal 14, produced by a magnetic pick-up, represents the engine speed NE. A thermistor producing a signal representing transmission oil temperature is carried on line 16 to the computer. The position of the range selector lever, represented by a signal on line 18, is supplied to the computer.

In addition, several items of information are recalled from electronic memory accessible to the central processing unit of the computer. EIP, a flag 20, shows the status of the engagement. It has the magnitude 0 when no engagement is in progress and 1 when engagement is in progress. The EIP flag is set based on a valid change in the position of a transmission range selection sensor (TRS). For purposes of engagements, the TRS sensor has three states: 1 represents the park and neutral positions, 2 represents reverse, and 3 represents any forward drive position. The EIP flag is cleared when time since engagement (TSE) exceeds a calibrated value, which represents the maximum period required to complete an engagement under worst-case conditions.

A timer is started in the microprocessor when a change in the TRS sensor output occurs. The count of the timer TSE represents the time since the beginning of the engagement.

Ideally, the blip period ends immediately before the hydraulic cylinder of the oncoming friction element is filled with hydraulic fluid. This allows the fastest engagement time and highest engagement quality. Practically, the length of time from the start of the engagement during which blip pressure is present, T1, should be set conservatively, i.e., such that the blip period will end significantly before the friction element cylinder is filled with hydraulic fluid. If the length of the period during which the ramp is active, T2, is exceeded by TSE, pressure is held at the final pressure until engagement of the friction element is completed, i.e., when EIP equals zero.

Figure 3:
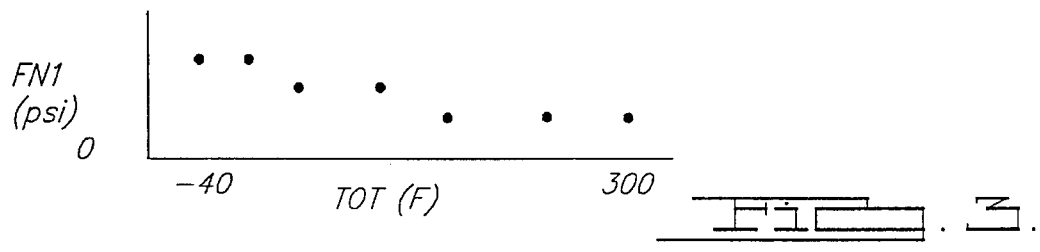
FIG. 3 is a graph showing the variation of blip EPC over a range of transmission oil temperature.
Figure 4:
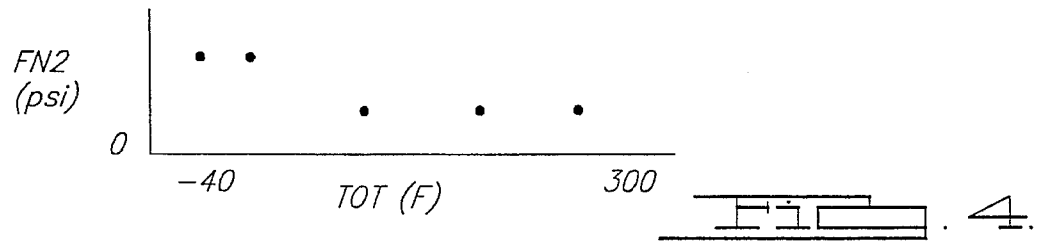
FIG. 4 is a graph showing the variation of EPC at the bottom of an hydraulic pressure ramp over a range of transmission oil temperature.
Figure 5:
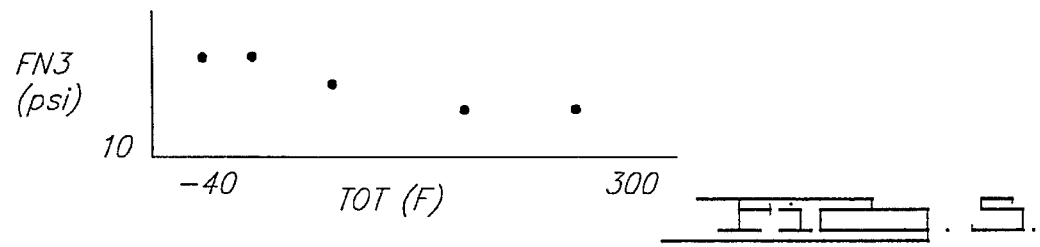
FIG. 5 is a graph showing a range of EPC at the end of the pressure ramp over a range of transmission oil temperature.

The magnitude of the variables FN1, FN2, and FN3 depend upon the torque capacity and flow characteristics of the oncoming friction element. Variables FN1, FN2, and FN3 are stored in electronic memory as functions, represented in the graphs of FIGS. 3–5, accessible by reference to the current value of X and the current transmission oil temperature TOT.

Figure 6:
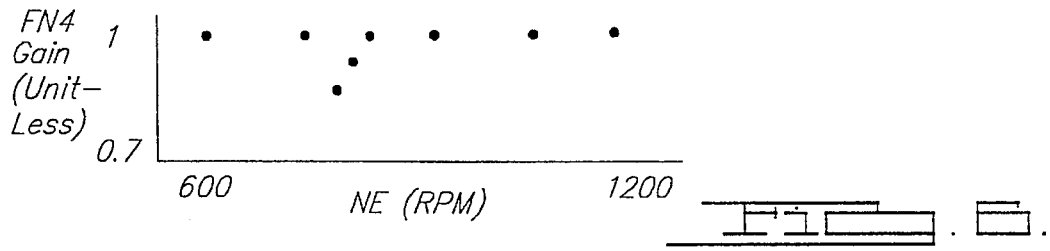
FIG. 6 is a graph showing the variation of maximum ramp pressure over a range of engine speed.

The value of the function FN4 depends on many factors. In the region where engagement of the friction element is to occur, the gain represented by FN4 is set such that an increase in EPC pressure caused by the ramp is offset by the gain caused by a decrease in engine speed. These actions stabilize EPC pressure during engagement of the friction element. FIG. 6 is a graph that shows the form of gain FN4 over a range of engine speed.

Refer again to FIG. 8. During the ramp phase, EPC rises linearly over an initial interval during which FN4 is approximately 1.0. Next, over an intermediate, second interval during which friction element engagement occurs, engine speed declines and FN4 assumes values lower than 1.0, such that any increase in EPC that would occur due to the linear pressure rise is offset by the lower values of FN4. Therefore, over the second interval, EPC is substantially constant. Thereafter, during a third interval in the ramp phase, immediately before completion of engagement and while engine speed declines, FN4 increases and EPC resumes its linear increase but at a reduced rate of increase or slope as determined by engine speed.

Turning now to the algorithm represented by the diagram of FIG. 2, the algorithm is executed, beginning at statement 24, when need to produce a change in the operating range of the transmission is required. An inquiry is made at statement 26 to determine whether a change in the selected operating range has occurred as indicated by monitoring TRS output. If that inquiry is false, command is directed to statement 28. But, if statement 26 is true, at 30 the engagement-in-process flag EIP is set equal to 1 and the TSE timer is set, initialized and turned on.

At statement 28, a check is made to determine whether there is an engagement in progress. If not, control is directed to exit engagement statement 32. However, if statement 28 is true, the nature or type of the commanded change in operating range represented by variable X is executed.

If the vehicle operator has commanded a change from forward drive ratio to reverse, statement 34 is true, and at 36 X is assigned the value 1. If statement 34 is false and the vehicle operator has commanded a change in operating range from reverse to forward, statement 38 is true, and at 40 X is assigned the value 2. If statement 38 is false and the vehicle operator has commanded a change in range from neutral to reverse, statement 42 is true, and at 44 X is assigned the value 3. If statement 42 is false, at 46 X is assigned the value 4.

After the value of the variable X is assigned, control is directed to statement 48 to determine whether the time since the start of engagement is less than time T1, thereby indicating that the engagement is in the blip pressure range. If statement 48 is true, EPC is set equal to the value of FN1 taken from electronic memory using X as an index to the required function and transmission oil temperature as the independent variable.

If statement 48 is false, then at 52, the time since the start of engagement is compared to T2, the length of time from the start of engagement to the conclusion of the ramp phase of the engagement. If statement 52 is true, then the magnitude of EPC is set equal to $$EPC = FN2 + \{(FN3 - FN2) * [(TSE - T1)/(T2 - T1)]\} * FN4$$

The values for variables FN2 and FN3 are also recalled from electronic memory using X as an index and TOT as an independent variable. The value for FN4 is recalled from memory using X as an index and engine speed as an independent variable.

If statement 52 is false, thereby indicating that the engagement is completed, flag EIP is set equal to zero, indicating that there is no friction element engagement in progress.

The magnitude of the variable EPC is produced at an output port of a microprocessor 64 and converted in a driver circuit to a direct current of variable magnitude, which is applied to the variable force solenoid 58. The solenoid controls the operation of a pressure control valve, whose output is connected to the friction element. A source of line pressure is applied to the pressure control valve. Transmission oil at EPC pressure is directed from the pressure control valve to the cylinder 60 and one side of a friction element piston 66. The discs of friction element 62 are forced into functional drive engagement by piston 66 in accordance with the magnitude of EPC commanded by the output of the microprocessor 64.

Having described a preferred embodiment of our invention, what we claim and desire to secure by U.S. Letters patent is:

1. A method for controlling engagement of a friction element of an automatic transmission having a range selector moveable among positions corresponding to selected operating ranges, comprising the steps of:

monitoring movement of the range selector for indication of a change in the selected range;

determining the character of the change in selected range;

determining the current temperature of transmission fluid used to engage the friction element;

determining a desired predetermined magnitude of fluid pressure supplied to the friction element during a relatively high pressure blip phase of engagement corresponding to the current fluid temperature and the character of the change in selected range;

supplying a source of line pressure to the inlet of a pressure control valve operated by a variable force solenoid;

supplying to the solenoid an electric current whose magnitude corresponds to the desired fluid pressure magnitude; and connecting fluid pressure at the outlet of the pressure control valve to the friction element.

2. The method of claim 1, further comprising:

determining a desired magnitude, corresponding to the current fluid temperature and the character of the change in selected range, of fluid pressure supplied to the friction element at the end of the blip phase of engagement; and supplying to the solenoid an electric current whose magnitude corresponds to said desired fluid pressure magnitude.

3. The method of claim 1 further comprising:

determining desired predetermined magnitudes corresponding to current fluid temperature and the character of the change in selected range of fluid pressure supplied to the friction element at the beginning and end of a ramp phase of engagement;

determining the desired time rate of increase of fluid pressure during the ramp phase of engagement; and applying to the solenoid a variable electric current corresponding to the desired magnitude and desired time rate of increase of fluid pressure during the ramp phase of engagement.

4. The method of claim 1, further comprising:

determining desired magnitudes at the beginning and end of a ramp phase of engagement of friction element fluid pressure corresponding to current fluid temperature and the character of the change in selected range;

determining, from said desired magnitudes and a desired length of the ramp phase, a desired first rate of increase of said fluid pressure during a first interval of the ramp phase of engagement; and monitoring current engine speed to establish the end of the first interval the ramp phase when engine speed decreases due to engagement of the friction element.

5. The method of claim 4, further comprising:

monitoring current engine speed to establish the end of the first interval and the beginning of a second interval of the ramp phase when engine speed decreases due to engagement of the friction element;

maintaining friction element fluid pressure substantially constant at the magnitude corresponding to the end of the first interval for the duration of the second interval; and monitoring current engine speed to establish the end of the second interval of the ramp phase when engine speed stops decreasing due to engagement of the friction element.

6. The method of claim 5, further comprising:

monitoring current engine speed to establish the end of the second interval and the beginning of a third interval of the ramp phase when engine speed stops decreasing due to engagement of the friction element;

increasing friction element fluid pressure during the third interval at a second time rate of increase determined on the basis of engine speed and the first time rate of increase.

7. A method for controlling engagement of a friction element of an automatic transmission having selectable operating ranges, comprising the steps of:

watching for a change in the selected range;

determining the character of the change in selected range;

determining the current temperature of transmission fluid used to engage the friction element;

determining a desired magnitude of friction element fluid pressure during a relatively high pressure blip phase of engagement corresponding to the current fluid temperature and the character of the change in selected range;

determining a desired magnitude of friction element fluid pressure at the end of the blip phase of engagement corresponding to the current fluid temperature and the character of the change in selected range;

determining desired magnitudes at the beginning and end of a ramp phase of engagement of friction element fluid pressure corresponding to current fluid temperature and the character of the change in selected range;

determining, from said desired magnitudes and a desired length of the ramp phase, a desired first rate of increase of said fluid pressure during a first interval of the ramp phase of engagement;

monitoring current engine speed to establish the end of the first interval the ramp phase when engine speed decreases due to engagement of the friction element;

supplying a source of line pressure to the inlet of a pressure control valve operated by a variable force solenoid;

supplying to the solenoid an electric current whose magnitude corresponds to the desired fluid pressure magnitude; and connecting fluid pressure at the outlet of the pressure control valve to the friction element.

8. The method of claim 7, further comprising:

monitoring current engine speed to establish the end of the first interval and the beginning of a second interval of the ramp phase when engine speed decreases due to engagement of the friction element;

maintaining friction element fluid pressure substantially constant at the magnitude corresponding to the end of the first interval for the duration of the second interval; and monitoring current engine speed to establish the end of the second interval of the ramp phase when engine speed stops decreasing due to engagement of the friction element.

9. The method of claim 8, further comprising:

monitoring current engine speed to establish the end of the second interval and the beginning of a third interval of the ramp phase when engine speed stops decreasing due to engagement of the friction element;

increasing friction element fluid pressure during the third interval at a second time rate of increase determined on the basis of engine speed and the first time rate of increase.

10. A method for controlling engagement of a friction element of an automatic transmission having selectable operating ranges, comprising the steps of:

watching for a change in the selected range;

determining the character of the change in selected range;

determining the current temperature of transmission fluid used to engage the friction element;

supplying to the friction element during a relatively high pressure blip phase of engagement a magnitude of fluid pressure corresponding to the current fluid temperature and the character of the change in selected range;

supplying to the friction element at the end of the blip phase a magnitude of fluid pressure corresponding to the current fluid temperature and the character of the change in selected range;

determining desired magnitudes at the beginning and end of a ramp phase of engagement of friction element fluid pressure corresponding to current fluid temperature and the character of the change in selected range;

supplying to the friction element during a first interval of the ramp phase fluid pressure that increases over time at a first rate of increase determined from said desired magnitudes at the beginning and end of the ramp phase and a desired length of the ramp phase; and monitoring current engine speed to establish the end of the first interval the ramp phase when engine speed decreases due to engagement of the friction element.

11. The method of claim 10, further comprising:

monitoring current engine speed to establish the end of the first interval and the beginning of a second interval of the ramp phase when engine speed decreases due to engagement of the friction element;

maintaining friction element fluid pressure substantially constant at the magnitude corresponding to the end of the first interval for the duration of the second interval; and monitoring current engine speed to establish the end of the second interval of the ramp phase when engine speed stops decreasing due to engagement of the friction element.

12. The method of claim 11, further comprising:

monitoring current engine speed to establish the end of the second interval and the beginning of a third interval of the ramp phase when engine speed stops decreasing due to engagement of the friction element; and increasing friction element fluid pressure at a second time rate of increase on the basis of engine speed.

* * * * *